Oct. 11, 1932.　　　　C. WILT　　　　1,882,467
TRACTION DEVICE
Filed Nov. 10, 1930
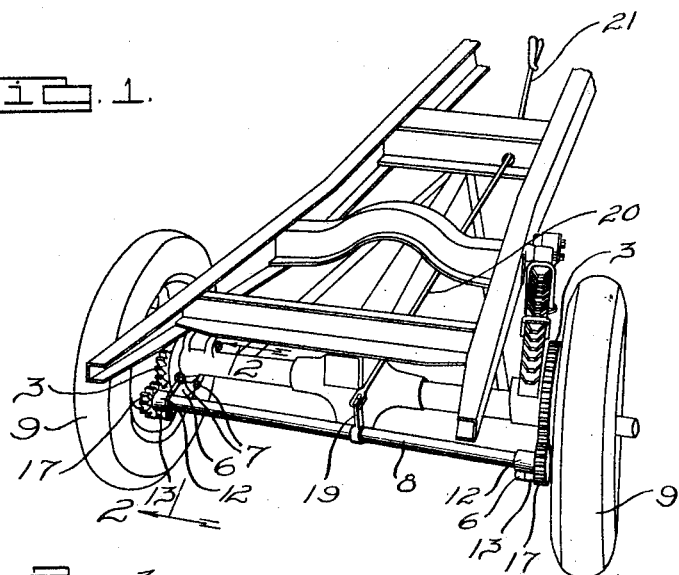
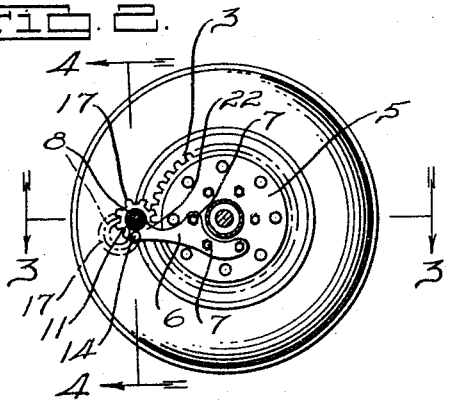
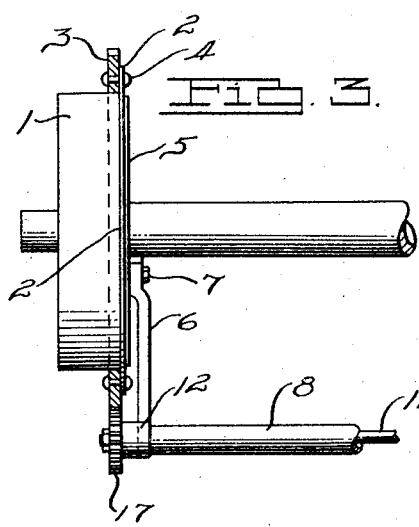
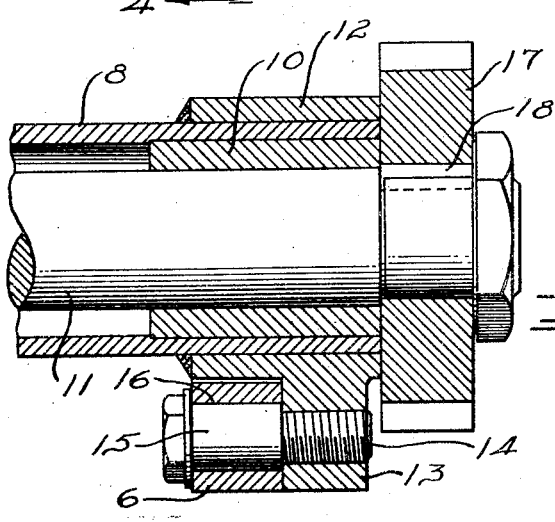
INVENTOR
Clinton Wilt.
BY
ATTORNEY Patented Oct. 11, 1932

1,882,467

UNITED STATES PATENT OFFICE

CLINTON WILT, OF DETROIT, MICHIGAN

TRACTION DEVICE

Application filed November 10, 1930. Serial No. 494,464.

This invention relates to traction devices and the object of the invention is to provide a traction device for use on trucks to connect the driving wheels together and to cause them to rotate together when pulling out of soft ground and under other poor traction conditions.

Another object of the invention is to provide a traction device which may be easily installed on a truck and which is operable by means of a lever to throw the traction device into or out of engagement.

Another object of the invention is to provide a traction device which, when in engagement, causes both driving wheels to rotate together and prevents the condition arising in which one wheel remains stationary while the other one rotates as is common with the ordinary differential drive.

A further object of the invention is to provide a traction device mounted on the rear axle of a truck and normally held out of operative engagement but should the truck encounter soft ground, mud, snow, ice, or extremely stiff grades, the traction device may be thrown into gear to cause both driving wheels to pull evenly and move the truck under conditions where it would be impossible to move the truck with the ordinary differential.

These objects and the several novel features of the invention are hereinafter more fully described and claimed and the preferred form of construction by which these objects are attained is shown in the accompanying drawing in which—

Fig. 1 is a perspective view of the rear end of a truck chassis equipped with my improved traction device.

Fig. 2 is an enlarged section taken on line 2—2 of Fig. 1.

Fig. 3 is a section taken on line 3—3 of Fig. 2.

Fig. 4 is an enlarged section taken on line 4—4 of Fig. 2.

As shown in Fig. 3 the brake drums 1 of the truck are each provided with a flange 2 and a ring gear 3 is positioned over the drum and against the flange 2 and is secured to the flange 2 by the rivets 4. This provides a gear 3 for each driving wheel which rotates with the respective driving wheel due to the fact that the brake drums are secured to the driving wheels. The rear axle housing is provided with a hub flange 5 at each end and a bracket 6, shown in Figs. 1, 2 and 3, is secured to the hub flange 5 by the screws or bolts 7. The tubular member 8, shown in Fig. 1, extends between the driving wheels 9 and is provided with a bronze bushing 10 in each end in which the shaft 11 is rotatably mounted, as shown in Fig. 4. A bracket 12 is welded onto each end of the tubular member 8 and each bracket 12 is provided with a depending lug 13, as shown in Fig. 4, into which a machine screw 14 is threaded. Each machine screw 14 is provided with a cylindrical portion 15 which is inserted in the aperture 16 in the end of the respective bracket 6 so that the brackets 12 are pivotally mounted in the ends of the brackets 6. This construction allows the tube 8 to be swung from the position shown in full lines in Fig. 2 to that shown in dotted lines in said figure.

Secured to each end of the shaft 11 is a gear 17 which are provided with teeth adapted to mesh with the teeth of the gears 3 and each gear 17 is secured to the end of the shaft 11 by means of a key 18, as shown in Fig. 4. As shown in Fig. 1, an arm 19 is secured to the tube 8 intermediate its ends and a rod 20 is pivotally connected to the upper end of the arm 19 and extends forward to a lever 21 by which the device may be moved to throw the gears 17 into or out of mesh with the gears 3 on the brake drums 1. As will be noted from Fig. 2, each bracket 6 is provided with a lug 22 against which the brackets 12 on the tube 8 engage when the gears 17 are in mesh with the gears 3. The parts are held against the lugs 22 by means of the rod 20 and lever 21 and these lugs 22 prevent the gears from meshing too deeply which would cause undue friction and wear.

In the position shown in Fig. 1, the gears 17 are out of mesh with the gears 3 and, when in this position, the truck may be driven in the usual manner. Upon encountering soft ground, mud, snow, ice, or stiff grades or other conditions in which the traction is poor, the lever 21 may be moved to draw the rod 20 forward which, by means of the arm 19, turns the tube 8 and brackets 12 on the pivot pins 15 thus moving the tube 8 to bring the gears 17 into mesh with the gears 3 on the brake drums. At this time, if one wheel 9 should turn, the turning movement is communicated through the respective gear 17, shaft 11 and other gear 17 to the other wheel 9 so that both wheels are rotated in the same direction and at the same speed.

Thus either wheel which has the best traction tends to carry the load and the turning of the other wheel at the same speed therewith assists in moving the load so that any ordinary condition of poor traction is quickly overcome. This device in effect eliminates the differential when it is applied so that both driving wheels must be driven at the same speed and with the same power and will move the load out of places where it is impossible to move the load with the use of only the ordinary differential. It is also to be noted that the device will operate in the reverse direction as well as in the forward direction and by causing both driving wheels to rotate together in either direction, it is almost impossible for a truck to get into a position where it cannot be driven out under its own power.

From the foregoing description, it becomes evident that the device is very simple and efficient in operation, will not easily get out of order, may be easily installed on a truck and provides a device which accomplishes the objects described.

Having thus fully described my invention, its utility and mode of operation, what I claim and desire to secure by Letters Patent of the United States is—

In a traction device for vehicles having an axle housing provided with a flange at each end, a pair of axles rotatably mounted in the axle housing, a differential connecting the two axles within the housing, a driving wheel secured to the outer end of each axle, a brake drum secured to each driving wheel and rotatable therewith, a gear secured to the exterior of each brake drum, a bracket secured to each flange of the axle housing and extending outwardly therefrom, a tubular member, a bracket secured to each end of the tubular member, the brackets on the tubular member being pivotally mounted in the outer ends of the brackets on the housing flanges, a shaft rotatably mounted in the tubular member, a gear secured to each end of the shaft and means for turning the tubular member on its pivot to move the gears on the shaft into or out of mesh with the gears on the brake drums.

In testimony whereof I sign this specification.

CLINTON WILT.